United States Patent Office 3,477,972
Patented Nov. 11, 1969

3,477,972
POLYISOBUTYLENE OXIDE STABILIZED WITH COMBINATIONS COMPRISING A PHENOL AND A METAL DITHIOCARBAMATE
Kosaku Kamio and Motoyuki Kuwana, Uozu-shi, Japan, assignors to Nippon Carbide Kogyo Kabushiki Kaisha, Tokyo, Japan, a corporation of Japan
No Drawing. Filed Dec. 19, 1966, Ser. No. 602,496
Claims priority, application Japan, Dec. 22, 1965, 40/78,511
Int. Cl. C08g 23/06, 51/62, 53/14
U.S. Cl. 260—18    9 Claims

ABSTRACT OF THE DISCLOSURE

A crystalline polyisobutylene oxide composition capable of being heated and melt-shaped at a temperature of 170–290° C. without substantial degradation comprising (a) a crystalline polyisobutylene oxide with a reduced specific viscosity of not less than 0.5 dl./g.; (b) at least one compound of the general Formula I

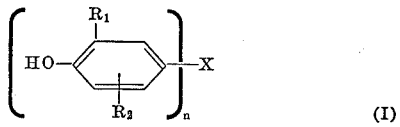

wherein $R_1$ represents a tertiary alkyl group of 4 or 5 carbon atoms; $R_2$ is selected from a hydrogen atom or an alkyl group of not more than 8 carbon atoms; $n$ is a positive integer of 2 or 3; and X is a sulphur atom or a hydrocarbon radical of the valence of $n$ with not more than 15 carbon atoms; and (c) at least one compound of the Formula II

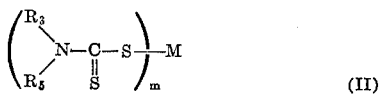

wherein $R_3$ and $R_4$ are the same or different groups of not more than 12 carbon atoms and selected from alkyl, cycloalkyl, aryl and aralkyl groups, with the proviso that $R_3$ and $R_4$ may show an alkylene or oxydialkylene bond with not more than 6 carbon atoms ring-closed via or not via an oxygen atom when $R_3$ and $R_4$ are an alkyl group; M represents a metal selected from alkali metals with an atomic number of 3, 11 and 19, alkaline earth metals with an atomic number of 4, 12 and 20, zinc, cadmium and bismuth; and $m$ is the valence of said metal, the combined amount of (b) and (c) in said composition being from 0.05–10% by weight, based on the weight of (a).

Such a composition containing a synergistic combination of stabilizers may also contain a lubricant comprising a higher aliphatic acid or metal salt thereof and/or a light stabilizing compound. Additionally, such a composition may contain at least one compound as an anticoloring agent.

---

This invention concerns a method of melt-shaping crystalline polyisobutylene oxide which is a polymer falling within the generic term of polyalkylene oxide but which has remarkably different treatment properties, above all, melt-shaping properties as compared with such polyalkylene oxide as polyethylene oxide and polypropylene oxide having the similar number of carbon atoms, without substantially deteriorating the inherent desirable properties, commercially and with excellent operability. Particularly, it relates to a method of melt-shaping crystalline polyisobutylene oxide, characterised by heating a polyisobutylene oxide shaping composition consisting of (a) a crystalline polyisobutylene oxide with a reduced specific viscosity of not less than 0.5 dl./g., preferably not less than 0.8 dl./g. and (b) at least one compound expressed by the general Formula I

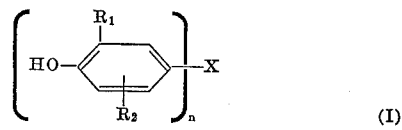

(wherein $R_1$ represents a tertiary alkyl group with 4 or 5 carbon atoms; $R_2$ represents a hydrogen atom or an alkyl group with not more than 8 carbon atoms; $n$ is a positive integer of 2 or 3; and X represents a sulphur atom or a hydrocarbon radical of the valence of $n$ with not more than 15 carbon atoms) and (c) at least one compound of the general Formula II

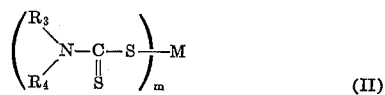

(wherein $R_3$ and $R_4$ are the same or different groups with not more than 12 carbon atoms chosen from alkyl, cycloalkyl, aryl and aralkyl groups with the proviso that they may show an alkylene or oxydialkylene bond with not more than 6 carbon atoms ring-closed via or not via an oxygen atom when $R_3$ and $R_4$ are an alkyl group; M represents a metal chosen from alkali metals with an atomic number of 3, 11 and 19, alkaline earth metals with an atomic number of 4, 12 and 20, zinc, cadmium and bismuth; and $m$ shows the valence of said metal) to a temperature of 170°–290° C., and then shaping the resulting molten composition. In the above-mentioned composition, the total amount of said (b) and (c) is of course sufficient to prevent the thermal change or degradation of the polymer (a).

Polyisobutylene oxides with a low degree of polymerisation having a specific reduced viscosity of 0.25 dl./g. have been known from old, but they are very fragile and cannot be serviceable shaping materials. In recent years, with the development of polymerisation catalysts, crystalline polyisobutylene oxide of a high degree of polymerisation has been exploited. As its properties have been remarkably improved, it has been spotlighted as a new shaping polymer.

The polyisobutylene oxide used in accordance with this invention having a reduced specific viscosity of as high as not less than 0.5 dl./g., especially not less than 0.8 dl./g., is a linear highly crystalline polymer with a high degree of polymerisation which has a melting point of more than 160° C. and even as high as 170° C. Heretofore, polymers of a considerably high degree of polymerisation have been obtained with respect to the known polyalkylene oxides, especially polyethylene oxide and polypropylene oxide, but their melting point is 80° C. at the highest, and usually 60°–70° C. at most, and attempts have been made to melt-shape them at a temperature in the vicinity of 100 C. usually in the presence of various heat-stabilisers.

These materials are at best utilised in the field of rubber materials or surface active agents, and with respect to the utilisation of fibers, films and other shaped articles, there has been no practical development like polyamide and polyolefine.

Prior to this application, applicant succeeded in the production of highly crystalline polyisobutylene oxide of a high degree of polymerisation having very excellent properties by the use of a dialkyl zinc-water-amine type catalyst. (U.S. patent application Serial No. 266,827, now abandoned; Japanese patent publication application No. 20,519/64.) The present invention relates to the method of melt-shaping such a highly crystalline polyisobutylene oxide with a high degree of polymerization.

It has been found that attempts to commercially melt-shape the highly crystalline polyisobutylene oxide of this invention having a reduced specific viscosity of not less than 0.5 dl./g., and preferably not less than 0.8 dl./g. from the standpoint of properties of the shaped articles to be obtained, for instance, to shape it under the molten condition by means of a melt-spinning machine, extruder or injection shaping machine, meets with grave difficulties. Namely, it has been found that shaped articles obtained by melt-shaping by means of processing machines are generally too fragile to withstand practical use, and do not possess tenacity possessed inherently by the isobutylene type polymers. This is because in the shaping of isobutylene oxide polymer by means of an industrial processing machine, it is necessary to melt it sufficiently by heating it to a temperature far higher than its melting point and to maintain the molten state for a considerably long time, and because at that time, the isobutylene oxide polymer is decomposed to the oligomers of isobutylene oxide polymer. Furthermore, this decomposition not only markedly lowers the shaping efficiency by requiring very strict processing conditions or shortening the running time, but also gives rise to unignorable undesirable changes or degradation even when the operation is carried out under such complicated and nonpractical conditions.

Even if attempts are made to employ such a temperature as can lead to the avoidance of such undesirable changes or degradation, the melt-shaping becomes impossible, and the temperature at least as high as the melting point of the polymer is necessary, a high temperature of 170–290° C. being needed generally. On the other hand, the obtained shaped article, more or less, substantially loses desirable properties possessed by the starting polyisobutylene oxide at such temperatures.

It is known with other polyalkylene oxides mentioned before that a disadvantageous degradation occurs even with the heating condition of around 100° C. For instance, with respect to the heating conditions in the casting of polypropylene oxide for use in rubber, its poorness of heat-stability poses a problem, and various stabilisers have been proposed.

However, such known heat stabilisers cannot be used for polyisobutylene oxide which should preferably be shaped under the molten condition and requires a remarkably high shaping temperature of 170–290° C. as compared with other polyalkylene oxides.

As a matter of fact, when a crystalline polyisobutylene oxide with a reduced specific viscosity of not less than 0.5 dl./g. is melt-shaped at 170–290° C. with the use of the previously proposed heat-stabiliser such as propyl pyrogallate, ascorbic acid, isoascorbic acid, and amino-phenols, the obtained shaped article does not serve the thermal stabilisation, but on the contrary, accelerates the decomposition of the said polymer. Hydroxyquinolines, inorganic or organic iodine compounds, thio-urea or its derivatives do not show heat-stabilising action. Furthermore, tetraalkyl thiuram disulfide, phenylene diamine, naphthylene diamine, benzidin and its derivatives, and phenolic heat stabilisers containing one benzene nucleus do not exhibit appreciable heat stabilising action. It has been found that 2,2'-methylenebis(4-alkyl-6-tert.-butyl phenol) and many other heat stabilisers more or less do not show satisfactory heat stabilising action at the shaping temperature required of crystalline polyisobutylene oxide contemplated by this invention.

Further researches have revealed that many of these other heat stabilisers cause the colouring of polyisobutylene oxide, or worsen the transparency of shaped articles, especially films, or degrade the quality of fibers which require whiteness, and therefore that in these respect also, the material to be treated in accordance with this invention has treatment properties different from those of the other analogous polyalkylene oxides.

We have made a research with respect to such heat stabilisers as will provide excellent shaped articles of polyisobutylene oxide having a specific reduced viscosity of not less than 0.5 dl./g., preferably not less than 0.8 dl./g. without degrading the excellent physical properties possessed by this polymer. As a result, we have found that the conjoint use of specific two kinds of compounds chosen from the very many compounds hitherto recognised as serving for the heat-stability of other polyalkylene oxide such as polyethylene oxide and polypropylene oxide, contrary to the already mentioned expectation, makes it possible to melt-shape a crystalline polyisobutylene oxide very advantageously.

We have discovered that the conjoint use of these compounds exhibits synergistic heat stabilising action 6 times as excellent as in the case of using these compounds singly, and that the objects of this invention can no longer be achieved even if either of a compound of the Formula I or I' to be referred to later in the said element (b) of this invention or a compound of the Formula II or II' to be referred to later in the said element (c) is substituted by an analogous compound previously proposed.

The proportion of the compounds of the said elements (b) and (c) to be used conjointly can be varied over a wide range, and it has been found that at certain proportions the synergistic heat stabilising effect is more remarkably improved.

Accordingly, an object of this invention is to provide a melt-shaping method by which it is possible to manufacture shaped articles of polyisobutylene oxide of a high degree of polymerisation by means of an industrial processing machine at a high rate while maintaining the molten state of the polymer for a long time and substantially preventing the decomposition of the polymer at high temperatures. A further object of this invention is to provide a method of manufacturing shaped articles of polyisobutylene oxide having excellent practical weatherability, and free from colouring and light degradation with passage of time.

Many other objects and advantages of this invention will be made clearer from the description which follows.

The resin used in this invention is a crystalline polyisobutylene oxide having a reduced specific viscosity of not less than 0.5 dl./g., preferably not less than 0.8 dl./g. By the reduced specific viscosity used herein is meant a value calculated by a krown method by measuring the viscosity of a solution at 140° C. by means of Ubbelohde visco-meter which has been prepared by adding p-dichlorobenzene containing 0.06% by weight of 2,6-dietert.-butyl p-cresol and 0.03% by weight of p-phenylene diamine, and heating and melting the mixture at 160° C. for 30 minutes in a nitrogen atmosphere, and whose concentration at 140° C. is 0.1 g. polyisobutylene oxide/100 ml. p-dichlorobenzene. The crystalline polyisobutylene oxide of a high degree of polymerisation used in this invention has a melting point of 165–170° C.

According to this invention, the composition may contain a comonomer copolymerisable with isobutylene oxide in a minor amount such as not to substantially lower desirable strength and other properties. This amount, though varying depending upon the type of the comonomer, should not exceed 30% by weight of the copolymer to be obtained. In this invention, therefore, the crystalline polyisobutylene oxide is a term which also means a copolymer of isobutylene oxide with up to 30% by weight, usually less than 20% by weight, of such a comonomer. As such a comonomer, useful are the epoxides having no hydroxyl, aldehyde, amino, and carboxyl group. Examples of such epoxides are ethylene oxide, propylene oxide, 1-butylene oxide, 2-butylene oxide, styrene oxide, cyclohexene oxide, ethylglycidyl ether, isopropylglycidyl ether, tert.-butylglycidyl ether, cyclohexylglycidyl ether, phenylglycidyl ether, p-chlorophenylglycidyl ether and allylglycidyl ether.

The heat stabiliser used according to the method of this invention consists of known compounds of the element (b) and element (c), and each of the component (b) and component (c) may be used in plurality.

Component (b) is the compound shown by the Formula I

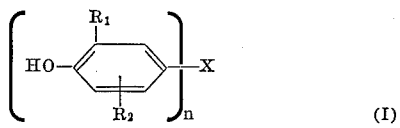
(I)

(wherein $R_1$ represents a tertiary alkyl group having 4 or 5 carbon atoms; $R_2$ represents a hydrogen atom or an alkyl group having not more than 8 carbon atoms; $n$ is a positive integer of 2 or 3; X is a sulphur atom or a hydrocarbon residue of the valence of $n$ with not more than 15 carbon atoms). Such a tertiary alkyl group includes tert.-butyl and tert.-amyl. Preferable alkyl groups represented by $R_2$ are methyl, ethyl, iso-propyl, tert.-butyl, and tert.-amyl. As the hydrocarbon radical represented by X, the following preferable residues can be cited:

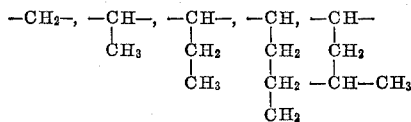

and

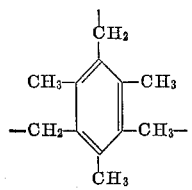

The $n$ in the formula is equal to the valency of the hydrocarbon residue represented by X.

Preferable examples of such a (b) component are 4,4'-thiobis(3-methyl-6-tert.-butylphenol),
4,4'-thiobis(2,6-ditert.-butylphenol),
4,4'-thiobis(3-methyl-6-tert.-amylphenol),
4,4'-thiobis(3-ethyl-6-tert.-butylphenol),
4,4'-methylenebis(3-methyl-6-tert.-butylphenol),
4,4'-methylenebis(2,6-ditert.-butylphenol),
4,4'-methylenebis(3-methyl-6-tert-amylphenol),
4,4'-ethylenebis(3-methyl-6-tert.-butylphenol),
4,4'-butylidenebis(3-methyl-6-tert.-butylphenol),
4,4'-butylidenebis(3-methyl-6-tert.-butylphenol),
4,4'-butylidenebis(2,6-ditert.-butylphenol),
1,1,3-tris(2-methyl-4-hydroxy-5-tert.butylphenol) butane,
1,1,3-tris(3-methyl-4-hydroxyl-5-tert.-butylphenol) butane,
1,3,5-trimethyl-2,4,6-tris(2-methyl-4-hydroxy-5-tert.-butylbenzyl) benzene, and
1,3,5-trimethyl-2,4,6-tris(3,5-ditert.-butyl-4-hydroxybenzyl) benzene.

A combination of component (c) with a compound of the Formula I'

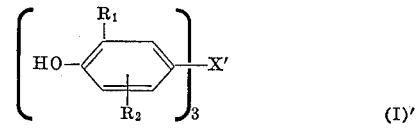
(I)'

(wherein $R_1$ is a tertiary alkyl group with 4 or 5 carbon atoms; $R_2$ is a hydrogen atom or an alkyl group with not more than 8 carbon atoms; and X' is a trivalent hydrocarbon radical with not more than 15 carbon atoms), which corresponds to the general Formula I wherein $n$ is 3 and X is a trivalent hydrocarbon residue, is especially preferable because the combination not only exhibits an excellent heat stability for a long time at a far higher melt-shaping temperature of 180–290° C., particularly under the molten state at 220–290° C., but also gives desirable transparency and whiteness to the obtained shaped article.

Component (C) of the composition of this invention is a compound expressed by the general Formula II

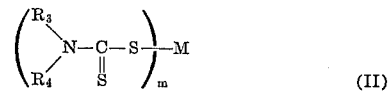
(II)

(wherein $R_3$ and $R_4$ are the same or different groups chosen from alkyl, cyclohlkyl, aryl and aralkyl groups having not more than 12 carbon atoms with the proviso that they may show an alkylene or oxydialkylene bond with not more than 6 carbon atoms ring-closed via or not via an oxygen atom when $R_3$ and $R_4$ are an alkyl group; M represents a metal chosen from alkali metals with an atomic number of 3, 11 and 19, alkaline earth metals with an atomic number of 4, 12 and 20, zinc, cadmium and bismuth; and $m$ shows the valence of said metal).

As preferable groups represented by $R_3$ and $R_4$, alkyl groups such as methyl, ethyl, propyl, butyl and octyl, aryl groups such as a phenyl group and naphthyl group, a cycloalkyl group such as cyclohexyl, and aralkyl groups such as a benzyl group and phenylethyl group may be cited. A pentamethylene bond, hexamethylene bond and oxydiethylene bond can be cited as preferable examples of the alkylene or oxydialkylene bond represented by $R_3$ and $R_2$ with not more than 6 carbon atoms ring-closed via or not via an oxygen atom.

As the M, zinc is especially more preferable than other metals because it not only gives rise to the marked improvement in heat stability when used conjointly with the compound of the element (b), but also simultaneously shows such effects as the transparency, whiteness and improved dyeability of the obtained shaped articles. Other preferable examples of the metals represented by M are sodium, potassium, calcium, cadmium and bismuth. As the preferable examples of such component (c), we can list lithium, sodium, potassium, beryllium, magnesium, calcium, zinc, cadmium and bismuth salts each of dimethyldithiocarbamate, diethyldithiocarbamate, di-n-propyldithiocarbamate, di-n-butyldithiocarbamate, di-n-octyldithiocarbamate, methyl phenyldithiocarbamate, ethylphenyldithiocarbamate, dibenzyldithiocarbamate, dicyclohexyldithiocarbamate, N - pentamethylenediethiocarbamate, and N-oxydiethylenedithiocarbamate. Further, amine complexes of these metal compounds such as piperidine complex of zinc pentamethylenedithiocarbamate and cyclohexylethylamine complex of Zn salt of ethylphenyl dithiocarbanate can be used similarly. Therefore, in this invention, the compound of component (c) includes such amine complexes.

A compound expressed by the general Formula II', which corresponds to the general Formula II wherein $m$ is 2 and M is Zn

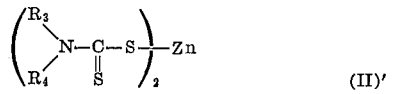
(II)'

(wherein $R_3$ and $R_4$ are the same or different groups with not more than 12 carbon atoms chosen from alkyl, cycloalkyl, aryl and aralkyl groups, with the proviso that they may show an alkylene or oxydiethylene bond with not more than 6 carbon atoms ring-closed via or not via an oxygen atom when $R_3$ and $R_4$ are alkyl groups), when used in combination with component (b), exhibits an excellent heat stability for a long time in the molten state at a far higher temperature of 180–290° C., especially 220–290° C., but also serves for the improvement of transparency, whiteness and dyeability of the shaped articles.

In particular, a combination of the compound shown by the Formula I' and the compound shown by the Formula II' exhibits an excellent heat stability for a long time under the molten state at temperatures as high as 180–290° C. for instance, 240–290° C., and is very advantageous both from the standpoint of processability and industrial shaping operation. A combined amount of the compound of the Formula I and the compound of the Formula II to be incorporated into the shaping composition of this invention is ordinarily 0.05–10% by weight, preferably 0.1–5% by weight, based on the crystalline polyisobutylene oxide. Generally, if the combined amount of both compounds does not reach 0.05% by weight of the said polymer, the heat stability effect is very insufficient, and the properties of the obtained shaped articles are deteriorated. Sufficient stability at the shaping temperature can be obtained in the amounts up to 10% by weight. It is insignificant to use them in excess, and if the amount is too much, difficulty will sometimes be met in respect of colouring. The excess amount also tends to worsen the physical properties of the said isobutylene oxide, so that the amount of 0.05–10% by weight, especially preferably 0.1–5% by weight is sufficient. The compound of the Formula II is added in an amount of 10–80% by weight, preferably 25–65% by weight, based on the combined amount of the compounds of the Formula I and Formula II.

If any one of the compounds in the said combination is omitted, the effects of this invention cannot be achieved to whatever degree the amount of addition is varied.

Synergistic effect of heat stability can be attained by the conjoint use of the compounds of the Formulas I and II. In addition, when the compound of the Formula II is conjointly used in an amount of 10–80% by weight based on the combined amount of the compounds of the Formulas I and II, the synergistic effect is markedly increased to about twice the effect obtained when each of the compounds is singly used in the same amount and under the same condition. The synergistic effect is increased to about 4 times when the compound of the Formula II is used conjointly in an amount of 25–65% based on the combined amount of the compounds of the Formulas I and II.

Below is shown one experiment regarding the synergistic effect of this invention.

A shaping composition was prepared by adding a combined amount of 1.5% by weight of 1,1,3-tris(2-methyl-4-hydroxy-5-tert.-butylphenyl) butane as component (b) and zinc di-n-butyldithiocarbamate as component (c) to a high molecular weight, highly crystalline polyisobutylene oxide with a reduced specific viscosity of 2.14 dl./g. The so prepared composition was put into a glass Petri dish, and this Petri dish was accomodated in a hot air constant temperature vessel, and heated at a temperature of 220° C. The state of its degradation was shown by the time during which heating was carried out until the decrease of the composition was 5% by weight of the original weight. The results were shown in Table 1 below. The amount of use was the same both in the case of the conjoint use and the single use.

TABLE 1

| $c/b+c$ (wt. percent): | Time (min.) |
|---|---|
| 0 | 13 |
| 5 | 21 |
| 10 | 28 |
| 25 | 51 |
| 40 | 79 |
| 50 | 86 |
| 65 | 56 |
| 80 | 27 |
| 90 | 14 |
| 100 | 8 |

It can be understood from the above table that if the incorporation of the component (b) and component (c) is 10–80% by weight, especially preferably 25–65% by weight, in terms of $c/b+c$ (percent by weight), the markedly increased synergistic effects are achieved.

The crystalline polyisobutylene oxide shaping composition of this invenition can be obtained by employing an optional means of mixing uniformly the component (a), one or more of component (b) and one or more of component (c). The time of mixing is not particularly limited, and it is sufficient if these components are co-present under the molten state at a temperature of from 170 to 290° C. at the time of melt-shaping. Namely, the incorporation of components (b) and (c) into component (a) may be made at the end of the polymerisation for synthesising polyisobutylene oxide or at the time when the polyisobutylene oxide is molten. Or powdery polyisobutylene oxide is immersed in a solution of heat stabilisers (b) and (c), and then the solvent is removed. Or they may be properly mixed in the state of solid.

In the practice of this invention, such known lubricants, light stabilisers, and anti-coloring, agents which were proposed for polymers other than polyalkylene oxide, for instance, polyolefines, polymers having vinyl groups and/or polyamides, may be incorporated into the composition shaping. It should be understood therefore that in accordance with the method of this invention, compositions containing such a known additive are also included into the polyisobutylene oxide shaping composition of this invention. As a matter of course, such known additives as pigments, dyestuffs, fillers, plasticizers, and anti-static agents can also be added to the shaping composition of the present invention. The incorporation of (d) a lubricant, (e) a light stabiliser, (f) an anti-colouring agent in this invention is advantageous as they serve for the improvement in the flow of the composition at the time of shaping, resistance to light of the shaped article and anti-colouring property of the shaped articles. Particularly, the shaping of the composition containing (d) a lubricant and (e) a light stabiliser is a preferable embodiment.

As such additives, various compounds are known, but in this invention, the use of the following compounds is especially recommended.

As the additive (d), there is used a lubricant chosen from higher aliphatic acids with 10–20 carbon atoms and their metal salts (the metal being chosen from metals of Groups I and II of the Periodic Table, lead, nickel and aluminium). Especially preferable are stearic acid and its metal salts such as stearic acid, calcium stearate, barium stearate, sodium stearate, cadmium stearate, and aluminium stearate. Other examples are palmitic acid, lauric acid, barium laurate, calcium palmitate, barium laurate and zinc palmitate. Such a lubricant should desirably be used in an amount of 0.05–4.0% by weight, preferably 0.08–2.0% by weight based on the weight of the polyisobutylene oxide. One or more than one compound can be used as the lubricant. By the addition of the lubricant, the residence time of the polyisobutylene oxide in the processing machine is very much shortened with a marked increase of the processing efficiency and and also the obtained shaped article is hardly coloured and is given good transparency.

The light stabiliser is expressed by the following general Formulas III

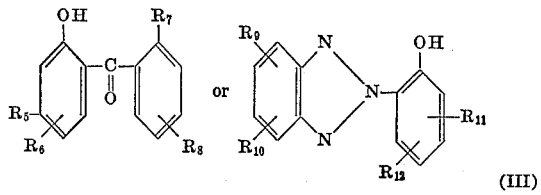

(wherein $R_5$, $R_6$, $R_7$, $R_8$, $R_9$, $R_{10}$, $R_{11}$ and $R_{12}$ represent the same or different groups chosen from a hydrogen atom, alkyl group, alkoxy group, hydroxy group, carboxyl group, amino group, acylamino group, carboalkoxy group and halogen atom). Particularly preferable light stabilisers are 2-hydroxy-4-methoxybenzophenone,
2-hydroxy-4-butoxybenzophenone,
2,2'-dihydroxy-4-methoxybenzophenone,
2-(2'-hydroxy-5'-methylphenyl) benzotriazle,
2-(2'-hydroxy-5'-tert.-butylphenyl) benzotriazole, and
2-(2'-hydroxy-5'N-acetylaminophenyl) benzotriazole.

Other examples include 2-hydroxybenzophenone,
2-hydroxy-4-octoxybenzophenone,
2,2'-dihydroxybenzophenone,
2,2'-dihydroxy-4,4'-dimethoxybenzophenone,
2-hydroxy-4-methoxy-2'-carboxybenzophenone,
2,2',4,4'-tetrahydroxybenzophenone,
2-hydroxy-4-benzoylbenzophenone,
2-hydroxy-4-benzyloxybenzophenone,
2'-(2'-hydroxy-3'-methyl-5'-isobutylphenyl) benzotriazole, and
2-(2'-hydroxy-3'-tert.-butyl-5'-methyl phenyl)5-chlorobenzotriazole.

It is desirable that the amount of the light stabiliser used is within the range of 0.01 to 5.0% by weight of the polyisobutylene oxide. One or more compounds can be employed as the light stabiliser of this invention.

The shaped articles obtained from the composition containing the light stabiliser have improved light stability, and are not deteriorated by light with the passage of time, showing an improvement in the so-called practical weatherability. Also these shaped articles, such as fibers and films, when dyed, show a markedly improved fastness to sunlight.

The anti-colouring agent (f) of this invention is expressed by the following Formula IV:

(wherein $R_{13}$ and $R_{14}$ are the same or different groups chosen from an aryl, alkoxy, alkyl-substituted phenoxy, phenoxy, thioalkoxy, thiophenoxy and alkyl-substituted thiophenoxy groups; $R_{15}$ is a group chosen from an aryl, hydroxy, alkoxy, thioalkoxy, phenoxy, alkyl-substituted phenoxy, thiophenoxy and alkyl-substituted thiophenoxy groups). Especially preferable anti-colouring agents are triphenyl phosphine, triphenyl phosphite and trilauryl thiophosphite. Others examples are tri-2-ethylhexyl phosphite, isooctyldiphenyl phosphite, tristearyl phosphite, trinonyl phosphite, tri(2-cyclohexylphenyl) phosphite, phenyl didecyl phosphite, diphenyl decyl phosphite, tri-p-tert.-butylphenyl thiophosphite and dodecyl thio phenyl phosphite. It is desirable that the amount of such an anti-colouring agent is generally 0.01–5.0% by weight of the polyisobutylene oxide of this invention. One or more compounds can be used as the anti-colouring agent of this invention. The addition of such an anti-colouring agent is of use in the prevention of colouration which is liable to occur in a certain combination of the components (b) and (c) at the time of melt-shaping of the polyisobutylene oxide.

In order to use a crystalline polyisobutylene oxide having a reduced specific viscosity of not less than 0.5 dl./g., preferably, 0.8 dl./g., usually 1.0–2.5 dl./g. and 5 dl./g. or more at the highest, a temperature of at least 170° C. is necessary at the time of melt-shaping. In actual operation, a temperature above 180° C. or as high as 200–290° C. is commercially advantageous. Therefore, one must solve a technical problem which is quite different from the technical problem of the prevention of thermal change or degradation of other polyalkylene oxide of which the shaping is carried out at a temperature below 150° C. usually around 100° C.

By the method of this invention, the practical melt-shaping of crystalline polyisobutylene oxide has been made possible for the first time.

For the shaping according to this invention, any optional method of known melt-shaping can be utilised. The obtained shaped article has desirable properties of the starting polymer.

In order to manufacture shaped articles more advantageously, it is desirable to carry out the melt-shaping in an atmosphere of an inert gas such as nitrogen and argon. The melting temperature given in this specification is an average value of the temperatures at which the polymer of the invention is in the molten state, and to excessively heat or cool the polymer for only a short time while the polymer is in the molten state does not bar the practice of the method of this invention. The melting temperature is an average of the roll temperature, press temperature and cylinder temperature in an extruder. It is of course preferable to properly choose the optimum temperature according to the method of processing. In general, the pressing or extrusion is carried out at a relatively low temperature, and the melt-spinning is performed at 220–290° C. When processing is done at such high temperatures, a compound of the Formula II wherein $n$ is 3 gives especially good results.

The shaped articles manufactured by this invention include general shaped articles made by extrusion, injection, inflation, transferring, pressing, flow immersion and other shaping method. They are, for instance, fibers, films, and coatings.

The fibers or films manufactured by this invention are increased in their mechanical strength such as tensile strength and bending strength to more than several times the original articles by drawing them for instance, drawing the undrawn fibers or films uniaxially or biaxially. Also by the drawing operation, the articles can attain more practical values such as the increase of transparency and the lowering of the brittle temperature. For example, if an undrawn filament with a tensile strength of 1.5 g./dl. is drawn to 4 times the original length at a temperature of 155° C., it comes to have a tensile strength as high as 5.0 g./dl. As heretofore mentioned, the shaped articles manufactured by the method of this invention hardly have undesirable colouring, and are excellent in practical weatherability. In particular, the fibers manufactured according to this invention have good affinity for dyestuffs and touch and other feelings, and are exceedingly useful on a practical basis.

As so far described, the commercially stable method of producing serviceable shaped articles of polyisobutylene oxide has been achieved for the first time by the use of a shaping composition prepared by mixing (a) the specified polyisobutylene oxide of a high degree of polymerisation and a heat stabiliser composed of the stabilisers (b) and (c) in the specified proportion and under the condition where the said shaping composition is melt-shaped at a temperature in the range of from 170 to 290° C.

This invention will hereinafter be explained with reference to working examples, by which this invention is in no way limited.

EXAMPLES 1–5 AND CONTROLS 1–3

A powdery polyisobutylene oxide with a reduced specific viscosity of 2.24 was immersed into a benzene or methanol solution containing each of the stabilisers in the amount indicated in Table 1, and thoroughly mixed. The solvent was then removed by vacuum distillation.

The so obtained shaping material was melted at a temperature of 230° C., and extruded through a nozzle with a diameter of 3 mm. of a melt-extruder to form a rod-like shaped article. The time needed for the shaping material to pass through the melt-extruder was 15 minutes on an average.

Three samples were taken out from different parts of the rod-like shaped product, and its reduced specific viscosity was measured. An average of reduced specific viscosities of each product and a ratio of decrease in reduced specific viscosity after shaping compared with that before shaping are also shown in Table 2.

TABLE 2

| Stabilizer | Weight (percent) | Reduced specific viscosity (dl./g.) | Ratio of decrease in viscosity (percent) |
|---|---|---|---|
| Example: | | | |
| 1 ..... (b) 4,4′-thiobis(3-methyl-6-tert.-butylphenol) | 0.5 | 2.02 | 9.8 |
| ........ (c) Sodium dibutyldithiocarbamate | 0.5 | | |
| 2 ..... (b) 4,4′-butylidene-bis(3-methyl-6-tert.-butylphenol) | 0.5 | 1.85 | 17.4 |
| ........ (c) Calcium diethyldithiocarbamate | 0.5 | | |
| 3 ..... (b) 4,4′-methylenebis(3-methyl-6-tert.-butylphenol) | 0.5 | 2.07 | 7.6 |
| ........ (c) Zinc diethyldithiocarbamate | 0.5 | | |
| 4 ..... (b) 1,1,3-tris(2-methyl-4-hydroxy-5-tert.-butylphenyl)butane | 0.5 | 2.18 | 2.7 |
| ........ (c) Zinc diethyldithiocarbamate | 0.5 | | |
| 5 ..... (b) 4,4′-butylidenebis(3-methyl-6-tert.-butylphenol) | 0.5 | 2.10 | 6.5 |
| Control: | | | |
| 1 ..... None | | 0.67 | 70.1 |
| 2 ..... (c) Zinc diethyldithiocarbamate | 1.0 | 1.02 | 54.5 |
| 3 ..... (b) 4,4′-butylidenebis(3-methyl-6-tert.-butylphenol) | 1.0 | 1.08 | 51.8 |

It is clear from Table 1 that the conjoint use of the stabilisers (b) and (c) according to this invention causes less lowering of viscosity than the use of the same amount of either the stabiliser (b) or (c), and exhibits a very great stabilising effect.

EXAMPLES 6–10 AND CONTROLS 4–5

A powdery polyisobutylene oxide with a reduced specific viscosity of 2.85 dl./g. was immersed into a benzene or methanol solution of stabilisers with a combined amount of stabilisers maintained at 1.0% by weight based on the polyisobutylene oxide, and thoroughly mixed. The solvent was then removed by vacuum distillation.

The so obtained sample was melted by heating it at 230° for 30 minutes, and cooled in the form of plate. The cooled product was further pressed for 10 minutes at a temperature of 200° C. and at a pressure of 30 kg./cm.² to make a plate-like shaped article. The reduced viscosity, impact strength and flexural strength of the obtained plate are shown in Table 3 below.

TABLE 3

| | Stabilisers (part by weight) | | Reduced viscosity of the pressed plate (dl./g.) | Impact strength (kg. cm./cm.²) | Flexural strength (kg./cm.²) |
|---|---|---|---|---|---|
| | (b) 1,1,3-tris(2-methyl-4-hydroxy-5-tert.-butylphenyl)butane | (c) Zinc di-n-butyldithiocarbamate | | | |
| Example: | | | | | |
| 6 | 0.2 | 0.8 | 1.62 | 3.12 | 740 |
| 7 | 0.4 | 0.6 | 2.24 | 4.45 | 860 |
| 8 | 0.9 | 0.5 | 2.58 | 4.82 | 860 |
| 9 | 0.6 | 0.4 | 2.08 | 4.03 | 850 |
| 10 | 0.8 | 0.2 | 1.40 | 2.71 | 720 |
| Control: | | | | | |
| 4 | 0 | 1.0 | 0.74 | 1.10 | 530 |
| 5 | 1.0 | 0 | 0.92 | 1.32 | 42 |

NOTE.—The impact strength and flexural strength were measured by means of Dynstat tester.

It is clear from Table 3 that the conjoint use of the stabilisers (b) and (c) causes less lowering of viscosity than the single use of either of the stabilisers, and helps to increase the strength of the shaped article.

EXAMPLE 11

To 100 parts by weight of a powdery polyisobutylene oxide with a reduced specific viscosity of 2.55 dl./g. were added 0.5 part of 1,1,3-tris(2-methyl-4-hydroxy-5-tert.-butylphenyl)butane as component (b) and 0.5 part of zinc di-n-butyldithiocarbamate as component (c), and the mixture was thoroughly stirred in a high speed rotating mixer. The obtained powdery mixture with an apparent specific gravity of 0.34 was spun by using a melt-spinning apparatus of the screw extruder ($\phi$ 25 mm.) type having 50 holes and a nozzle diameter of 0.7 mm., at a rate of 15 r.p.m. and at a temperature of 250° C. The obtained filaments (with a reduced specific viscosity of 1.88 dl./g.) were drawn to 4 times the original length of 150° C. in polyethylene glycol having a molecular weight of 400. The drawn filaments had a tenacity of 5.2 g./dl and an elongation of 18.5%.

CONTROLS 6–9

The procedures of Example 11 were repeated except that instead of 1,1,3-tris(2-methyl-4-hydroxy-5-tert.-butylphenyl) butane, a phenolic heat-stabiliser (Controls 6 and 7) similar to the stabiliser as component (b) but not falling within the component (b) was used, and instead of zinc di-n-butyldithiocarbamate, a compound (Controls 8 and 9) similar to the stabiliser as component (c) but not falling within the component (c) was used. Table 4 shows the reduced specific viscosity and tensile strength of the obtained filaments.

TABLE 4

| | Stabiliser (part by weight) | | Reduced specific viscosity (dl./g.) | Tensile strength (g./dl.) |
|---|---|---|---|---|
| Control: | | | | |
| 6 | 2.2'-methylenebis (4-methyl-6-tert.-butyl-phenol), 0.5. | Zinc-di-n-butyl-dithiocarbamate, 0.5. | 0.45 | (1) |
| 7 | 2,6-di-tert.-butyl p-cresol, 0.5. | Zinc-di-n-butyl-thiocarbamate, 0.5. | 0.37 | (1) |
| 8 | 1,1,3-tris(2-methyl-4-hydroxy-5-tert.-butyl-phenyl) butane, 0.5. | Tetramethyl-thiuram disulfide, 0.5. | 0.71 | 2 0.74 |
| 9 | 1,1,3-tris(2-methyl-4-hydroxy-5-tert.-butyl-phenyl) butane, 0.5. | Copper di-methyldithio-carbamate, 0.5. | 0.35 | (1) |

[1] Because of brittleness of the shaped article, it was impossible to hot draw it and measure its strength.
[2] It was impossible to hot draw the shaped article.

As is clear from Tables 3 and 4 given above, when either of the components in a combination of the components (b) and (c) of this invention is replaced by a stabiliser which falls outside this invention but is analogous to the stabilisers (b) or (c) of this invention, a synergistic effect of the said combination is not exhibited, and the obtained shaped article is brittle and does not withstand practical use. It can thus be understood that an excellent synergistic effect is exhibited for the first time by a combination of a specific stabiliser (b) and a specific stabiliser (c) of this invention.

CONTROLS 10–23

Procedures of Example 11 were repeated except that instead of the stabilisers used in Example 11, stabilisers known to be usable for a general polyolefin oxide such as polyethylene oxide and polypropylene oxide. The obtained filaments had a reduced specific viscosity and tensile strength shown in Table 5 below.

TABLE 5

| | | Filament | | |
|---|---|---|---|---|
| | Stabiliser (weight percent) | Reduced specific viscosity (dl./g.) | Tensile strength (g./dl.) | Coloring |
| Control: | | | | |
| 10 | None | 0.21 | (1) | |
| 11 | Propyl pyrogallate, 1.0 | 0.14 | (1) | Yellow. |
| 12 | Ascorbic acid, 1.0 | 0.18 | (1) | Do. |
| 13 | p-Amino phenol, 1.0 | 0.19 | (1) | Black. |
| 14 | Ammonium iodide, 1.0 | 0.22 | (1) | |
| 15 | Thiourea, 1.0 | 0.26 | (1) | Yellow. |
| 16 | Diphenylthiourea, 1.0 | 0.32 | (1) | Black. |
| 17 | Tetra methylthiuram disulfide, 1.0 | 0.39 | | Yellow. |
| 18 | p-Phenylene diamine, 1.0 | 0.51 | 2 0.55 | Brown. |
| 19 | Bendizine, 1.0 | 0.54 | 2 0.68 | Do. |
| 20 | 2,6-di-tert.-butyl p-cresol, 1.0 | 0.35 | (1) | |
| 21 | 2,2'-methylene bis(4-methyl-6-tert.-butyl phenol), 1.0 | 0.41 | 2 0.50 | |
| 22 | {4,4'-thiobis(3-methyl 6-tert.butyl phenol), 0.5 / Dioctadecyl thio dipropionate, 0.5} | 0.69 | 3 0.84 | |
| 23 | {1,1,3-tris(2-methyl 4-hydroxy 5-tert.-butyl phenyl) butane, 0.5 / Dioctadecylthio dipropionate, 0.5} | 0.77 | 3 0.85 | |

[1] Hot-drawing and measurement of tenacity impossible because of brittleness.
[2] Hot-drawing impossible.
[3] Drawn to 1.5 times the original length.

As shown in Table 5, the obtained filaments are more brittle either in the case of using the stabilisers known to be usable for general polyolefin oxides (Controls 11–21) or in the case of using a combination of stabilisers whose synergistic effect is known (Controls 22 and 23) than in the case of using a combination of the stabilisers (b) and (c) according to this invention. It is impossible to measure the physical properties of such shaped articles, and if it is possible, the article cannot be usable on a practical basis.

EXAMPLES 12–13 AND CONTROL 24

One hundred parts of a powdery polyisobutylene oxide with a reduced specific viscosity of 2.85 was thoroughly mixed with stirring with 0.5 part of zinc N-pentamethylene dithiocarbamate, 0.4 part of 4,4'-butylidenebis(3-methyl-6-tert.-butylphenol) and 0.1 part of 1,1,3-tris(2-methyl-4-hydroxy-5-tert.-butylphenyl) butane in a mixer. The obtained shaping material was melted at a predetermined temperature by a melt-extruder, and extruded through a nozzle with a diameter of 3 mm. while adjusting the time needed for the melt to pass through the melt-extruder to 15 minutes on an average. There was obtained a rod-like article. The characteristic and reduced specific viscosity of the obtained shaped article are shown in the following Table 6 with reference to the shaping temperature.

TABLE 6

| | Shaping temperature (°C.) | Reduced specific viscosity (dl./g.) | Characteristic of the obtained shaped article |
|---|---|---|---|
| Example: | | | |
| 12 | 220 | 2.75 | Tough. |
| 13 | 280 | 1.82 | Do. |
| Control: 24 | 300 | 0.71 | Brittle. |

As can be understood from the above results, when the melting temperature is 300° C., the lowering of viscosity of the shaped product is abrupt, and the shaped product is brittle.

EXAMPLES 14–18

One hundred parts by weight of a powdery polyisobutylene oxide with a reduced specific viscosity of 2.35 dl./g. and a melting point of 165° C. was admixed thoroughly with stirring in a mixer with 0.75 part by weight of 1,3,5-trimethyl-2,4,6-tris(3,5-di-tert.-butyl-4-hydroxybenzyl) benzene as component (b), 0.75 part by weight of zinc N-pentamethylene dithiocarbamate as component (c), and compounds (d), (e) and (f) shown in Table 7. The mixture was extruded at 210° C. by a melt-extruder through a nozzle with a diameter of 3 mm. to form a pellet-like shaping material.

The so obtained shaping material was spun through a melt-spinning apparatus (screw extruder with a diameter of 25 mm.; nozzle with a diameter of 0.7 mm.; 50 holes) at a temperature of 270° C. at a take-up speed of 170 m./min. The obtained undrawn filaments were drawn to 3 times the original length at 170° C. in air. The results are shown in Table 7.

TABLE 7

| | Additive (part by weight) | | Reduced specific viscosity (dl./g.) | | | Properties of drawn filaments | |
|---|---|---|---|---|---|---|---|
| (d) | (e) | (f) | Pellet shaping material | Undrawn filament | Drawn filament | Tensile strength (g./dl.) | Elongation (percent) |
| Example: | | | | | | | |
| 14 | | | 2.08 | 1.62 | 1.60 | 4.5 | 46 |
| 15 Calcium stearate (0.25). | | | 2.17 | 1.81 | 1.81 | 4.8 | 34 |
| 16 do | Triphenyl phosphine (1.0). | | 2.05 | 1.70 | 1.65 | 4.1 | 51 |
| 17 do | | 2-hydroxy-4-methoxy-benzophenone (0.25). | 2.02 | 1.57 | 1.55 | 4.3 | 39 |
| 18 do | Triphenyl phosphine (1.0). | 2(2'-hydroxy-5'-methylphenyl) benzotriazole (0.25). | 1.95 | 1.51 | 1.52 | 4.4 | 42 |

The filaments obtained in Examples 14–18 all exhibit an excellent tensile strength, a good dimensional stability showing no shrinkage at temperatures up to 120° C., and a good affinity for basic dyes.

When calcium stearate is added as component (d) as in Examples 15–18, the residence time in melt-spinning is shortened, and it becomes easier to manufacture filaments by melt-spinning at a high speed on a commercial basis. Also, filaments excellent in glossiness were obtained. The filaments obtained according to Examples 17 and 18 in which component (e) was added were excellent in weatherability, and when dyed, exhibit excellent fastness to sunlight. The filaments obtained according to Examples 17 and 18 in which component (e) was added were excellent in weatherability, and when dyed, exhibit excellent fastness to sunlight. The filaments obtained according to Examples 16 and 18 where component (f) was added were more excellent in whiteness and transparency.

CONTROL 25

Procedures of Example 14 were repeated except that as the stabiliser 1.5% by weight of zinc N-pentamethylene dithiocarbamate only was added, and a pellet-like shaping material with a reduced specific viscosity of 1.36 was obtained. Under the spinning conditions, however, the decomposition of the polymer was remarkable, and it was impossible to spin it, the spinnability of the melt having been lost.

CONTROL 26

Procedures of Example were repeated except that as the stabiliser, 1.5% by weight of 1,3,5-trimethyl-2,4,6-tris(3,5-di-tert.-butyl-4-hydroxybenzyl) benzene only was added, and a pellet-like shaping material with a specific reduced viscosity of 1.47 dl./g. was obtained. Under the spinning conditions, however, the decomposition of the polymer was remarkable and the extruded melt turned into an agglomerated mass and it was impossible to spin it.

CONTROL 27

Procedures of Example 14 were repeated except that there were added 0.75% by weight of 4,4'-thiobis(3-methyl-6-tert.-butylphenol) and 0.75% by weight of di-octadecylthiodipropionate both of which were known to be useful as stabilisers to be conjointly used for general polyolefins oxide, and a pellet-like shaping material with a reduced specific viscosity was obtained. Under the spinning conditions, however, it was impossible to obtain filaments of a constant denier because of marked yarn breakages. The obtained filaments had a reduced specific viscosity of 0.79 dl./g., and their tenacity was not commercially feasible.

It is clear from Examples 14–18 and Controls 25–27 that the conjoint use of the specific stabilisers (b) and (c) of this invention makes it possible to spin the obtained shaping material at 270° C. at a commercially feasible high rate and prepare filaments useful on a practical basis, but that when the conditions of this invention are not fulfilled, that is, when either of component (b) or (c) is used alone, or when stabilisers falling outside this invention but known to be usable conjointly are used, it is impossible to melt-spin polyisobutylene oxide at a commercially feasible rate.

These facts show that a combination of the stabilisers (b) and (c) chosen from the group of specific compounds of this invention exhibits unique and marked stabilising effects towards polyisobutylene oxide, which have not been expected from other known stabilisers.

EXAMPLE 19

One hundred parts by weight of a powdery polyisobutylene oxide with a reduced specific viscosity of 1.95 dl./g. was admixed with stirring in a mixer with 0.5 part by weight of 4,4'-thiobis(3-methyl-6-tert.-butylphenol), 0.5 part by weight of zinc N-oxydiethylene dithiocarbamate, and 0.25 part by weight of calcium stearate. The mixture was extruded by means of a melt-extruder at 200° C., and a pellet-like shaping material was obtained. This shaping material had a reduced specific viscosity of 1.87 dl./g. The temperature of the cylinder of an injection molder was elevated progressively from the inlet to the outlet, and the shaping material was injection moulded at a pressure of 50 kg./cm.$^2$ while the temperature of the outlet and that of the mold being adjusted at 210° C. and 55° C., respectively. Pen trays and nameplate cases were thus produced. Table 8 shows the physical properties of these products by measuring those of a part of each product that was cut off.

TABLE 8

| Properties | Unit | Measuring method | Pen trays | Name-plate cases |
|---|---|---|---|---|
| Reduced specific viscosity | Dl./g | | 1.69 | 1.66 |
| Thickness of sample | Mm | | 1.71 | 1.54 |
| Specific gravity | | | 1.01 | 1.01 |
| Impact strength | Kg. cm./cm.$^2$ | Dynastt DIN 53452 | 6.6 | 6.4 |
| Flexural strength | Kg./cm.$^2$ | do | 720 | 740 |
| Volume resistivity | Ω-cm | JIS K6723 | 1.4×10$^{16}$ | 1.5×10$^{16}$ |

EXAMPLES 20–22

In each of these examples, the five components shown in Table 9 were thoroughly stirred and mixed in a powdery solid in a mixer. The obtained mixture was extruded at 210° C. by a melt-extruder, and a pellet shaping material was obtained.

The obtained shaped material was extruded through a T-die with the die temperature maintained at 240° C., and a film with a thickness of 20μ and a width of 30 cm. was obtained. The reduced specific viscosity of the obtained film is also shown in Table 9.

TABLE 9

| Ex. | Constituents (part by weight) | Reduced specific viscosity (dl./g.) | | |
|---|---|---|---|---|
| | | Original polymer | Pellet | Film |
| 20 | (a) Polyisobutylene oxide (100) <br> (b) 4,4-butylidenebis(3-methyl-6-tert.-butylphenol) (0.75) <br> (c) Cadmium dimethyldithiocarbamate (0.75) <br> (d) Stearic acid (0-50) <br> (e) 2,2'-di-hydroxy-4-methoxy benzophenone (0.25) <br> (f) Tristearyl phosphite (0.75) | 1.76 | 1.70 | 1.52 |
| 21 | (a) Isobutylene oxide (90)-propylene oxide (10) copolymer <br> (b) 4,4'-thiobis(3-methyl-6-tert.-butylphenol) (0.75) <br> (c) Zinc ethylphenyl dithiocarbamate (0.75) <br> (d) Barium stearate (0.50) <br> (e) 2(2'-hydroxy-5'-acetylaminophenyl) benzotriazole (0.25) <br> (f) Tristearyltrithio phosphite (0.75) | 2.35 | 2.15 | 1.77 |
| 22 | (a) Isobutylene (90)-phenyl-glycidyl ether (10) copolymer <br> (b) 4,4'-methylenebis(3-methyl-6-tert.-butylphenol) (0.75) <br> (c) Bismuth dimethyldithiocarbamate (0.75) <br> (d) Calcium laurate (0.50) <br> (e) 2-hydroxy-4-methoxy-2'-carboxybenzophenone (0.25) <br> (f) Tri-2-ethylhexyl phosphite (0.75) | 1.85 | 1.74 | 1.41 |

When the obtained film was biaxially drawn to 1.5 times the original length in polyethylene glycol with a molecular weight of 400 heated to 155° C., a surprising increase in strength was observed. The drawn film was good in transparency with no colouring.

What is claimed is:

1. A crystalline polyisobutylene oxide composition capable of being heated and melt-shaped at a temperature of 170–290° C. without substantial degradation comprising (a) a crystalline polyisobutylene oxide with a reduced specific viscosity of not less than 0.5 dl./g.; (b) at least one compound of the general Formula I

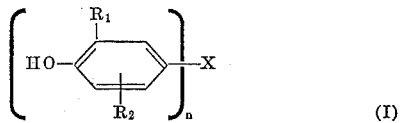

$$\left[ HO-\underset{R_2}{\overset{R_1}{\bigcirc}}-X \right]_n \quad (I)$$

wherein $R_1$ represents a tertiary alkyl group of 4 or 5 carbon atoms; $R_2$ is selected from a hydrogen atom or an alkyl group of not more than 8 carbon atoms; $n$ is a positive integer of 2 or 3; and X is a sulphur atom or a hydrocarbon radical of the valence of $n$ with not more than 15 carbon atoms; and (c) at least one compound of the Formula II.

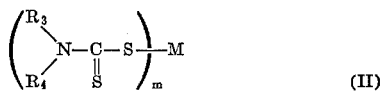

$$\left( \underset{R_4}{\overset{R_3}{\diagdown}} N-\underset{\underset{S}{\parallel}}{C}-S \right)_m M \quad (II)$$

wherein $R_3$ and $R_4$ are the same or different groups of not more than 12 carbon atoms and selected from alkyl, cycloalkyl, aryl and aralkyl groups, with the proviso that $R_3$ and $R_4$ may show an alkylene or oxydialkylene bond with not more than 6 carbon atoms ring-closed via or not via an oxygen atom when $R_3$ and $R_4$ are an alkyl group; M represents a metal selected from alkali metals with an atomic number of 3, 11 and 19, alkaline earth metals with an atomic number of 4, 12 and 20, zinc, cadmium and bismuth; and $m$ is the valence of said metal, the combined amount of (b) and (c) in said composition being from 0.05–10% by weight, based on the weight of (a).

2. The composition of claim 1 wherein (c) is 10–80% by weight of the combined weight of (b) and (c).

3. The composition of claim 1 wherein in Formula I, X represents a trivalent hydrocarbon radical with not more than 15 carbon atoms.

4. The composition of claim 1 wherein in Formula II, $m$ is 2 and M is zinc.

5. A crystalline polyisobutylene oxide capable of being heated and melt-shaped at a temperature of 180–290° C. without substantial degradation comprising (a) a crystalline polyisobutylene oxide with a reduced specific viscosity of not less than 0.8 dl./g., (b) at least one compound of the Formula I'

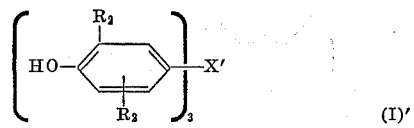

$$\left[ HO-\underset{R_2}{\overset{R_1}{\bigcirc}}-X' \right]_3 \quad (I)'$$

wherein $R_1$ represents a tertiary alkyl group of 4 or 5 carbon atoms; $R_2$ represents a hydrogen atom or an alkyl group with not more than 8 carbon atoms; and X' represents a trivalent hydrocarbon radical with not more than 15 carbon atoms and (c) at least one compound of the Formula II'

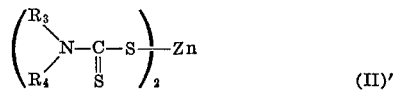

$$\left( \underset{R_4}{\overset{R_3}{\diagdown}} N-\underset{\underset{S}{\parallel}}{C}-S \right)_2 Zn \quad (II)'$$

wherein $R_3$ and $R_4$ represent the same or different groups of not more than 12 carbon atoms chosen from alkyl, cycloalkyl, aryl and aralkyl groups with the proviso that $R_3$ and $R_4$ may show an alkylene bond or oxydialkylene bond with less than 6 carbon atoms ring-closed via or not via an oxygen atom when $R_3$ and $R_4$ are an alkyl group, the combined amount of (b) and (c) being 0.05–10% by weight based on the weight of (a), the amount of (c) being 10–80% by weight based on the combined weight of (b) and (c).

6. The composition of claim 1 wherein said composition also contains as a lubricant at least one compound, in an amount of 0.04–4.0% by weight based on the weight of (a), chosen from higher aliphatic acids with 10–20 carbon atoms and their metal salts, the metal being chosen from metals of Groups I and II of the Periodic Table, lead, nickel and aluminum.

7. The composition of claim 1 wherein said composition also contains as a light absorber at least one compound, in an amount of 0.01–5.0% by weight based on the weight of (a), expressed by the following Formula III

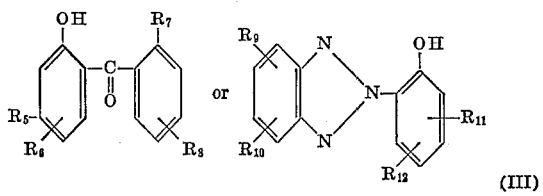

(III)

wherein $R_5$, $R_6$, $R_7$, $R_8$, $R_9$, $R_{10}$, $R_{11}$ and $R_{12}$ represent the same or different groups selected from a hydrogen atom, alkyl group, alkoxy group, hydroxyl group, carboxy group, amino group, acylamino group, carboalkoxy group and halogen atom.

8. The composition of claim 1 wherein such one compound, in an amount of 0.01–5.0% by weight based on the weight of (a), of the Formula IV

(IV)

wherein $R_{13}$ and $R_{14}$ are the same or different groups selected from an aryl group, alkoxy group, thioalkoxy group, alkyl-substituted phenoxy group, phenoxy group, thiophenoxy group, and alkyl-substituted thiophenoxy group; and $R_{15}$ represents a group selected from an aryl group, hydroxy group, alkoxy group, thioalkoxy group, phenoxy group, alkyl-substituted phenoxy group, thiophenoxy group and alkyl-substituted thiophenoxy group.

9. The composition of claim 6 wherein said composition also contains as a light stabilizer at least one compound, in an amount of 0.01–5.0% by weight based on the weight of (a), expressed by the following Formula III

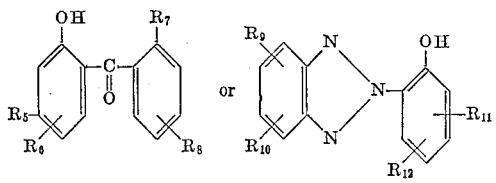

wherein $R_5$, $R_6$, $R_7$, $R_8$, $R_9$, $R_{10}$, $R_{11}$ and $R_{12}$ represent the same or different groups selected from a hydrogen atom, alkyl group, alkoxy group, hydroxyl group, carboxy group, amino group, acylamino group, carboalkoxy group and halogen atom.

References Cited

UNITED STATES PATENTS

| | | | |
|---|---|---|---|
| 2,655,492 | 10/1953 | Young et al. | 260—23 |
| 2,789,962 | 4/1957 | Groff et al. | 260—45.75 |
| 3,239,484 | 3/1966 | Stark | 260—45.9 |
| 3,326,484 | 6/1967 | Kelly et al. | 260—45.8 |
| 3,340,219 | 9/1967 | Stemmler | 260—32.6 |
| 3,352,820 | 11/1967 | Bawn | 260—45.75 |
| 3,365,419 | 1/1968 | Heuck et al. | 260—45.85 |
| 3,370,035 | 2/1968 | Ogura et al. | 260—45.75 |
| 3,379,675 | 4/1968 | Jensen et al. | 260—45.8 |

HOSEA E. TAYLOR, JR., Primary Examiner

R. WHITE, Assistant Examiner

U.S. Cl. X.R.

260—45.7, 45.75, 45.8, 45.9, 45.95; 264—176

UNITED STATES PATENT OFFICE
CERTIFICATE OF CORRECTION

Patent No. 3,477,972                             November 11, 1969

Kosaku Kamio et al.

It is certified that error appears in the above identified patent and that said Letters Patent are hereby corrected as shown below:

Column 1, formula II, "$R_5$" should read -- $R_4$ --. Column 5, lines 40 to 44, in the fourth column of the listing of the preferable residues   cancel

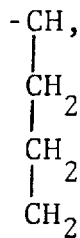           and insert           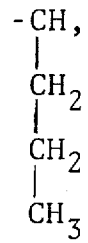

Column 5, lines 46 to 53, the lower right-hand portion of the formula reading $$-CH_3-$$     should read     $$-CH_2-$$

Columns 11 and 12, TABLE 2, in the heading marked "Ratio of decrease in viscosity (percent)" for Example 5, cancel "6.5" and insert -- 6.2 --; TABLE 3, in the heading marked "Flexural strength (kg./cm.$^2$)" cancel the last two entries and insert -- 350 -- and -- 420 --, respectively. Column 13, TABLE 4, cancel the heading "Tensile strength (g./dl.)" and insert -- Tensile strength (d/dl) --. Column 14, TABLE 6, under the heading "Reduced specific viscosity (dl./g)" for "Example 12", cancel "2.75" and insert -- 2.72 --.

Signed and sealed this 10th day of November 1970.

(SEAL)
Attest:

EDWARD M. FLETCHER, JR.                    WILLIAM E. SCHUYLER, JR.
Attesting Officer                          Commissioner of Patents